US012571637B2

(12) United States Patent (10) Patent No.: US 12,571,637 B2
Gloceri et al. (45) Date of Patent: Mar. 10, 2026

(54) BATTERY PRE-COOLING SYSTEM AND METHOD

(71) Applicant: Rivian IP Holdings, LLC, Plymouth, MI (US)

(72) Inventors: Gary J. Gloceri, Waterford, MI (US); Henry Huang, Ann Arbor, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 279 days.

(21) Appl. No.: 16/914,852

(22) Filed: Jun. 29, 2020

(65) Prior Publication Data

US 2021/0404827 A1 Dec. 30, 2021

(51) Int. Cl.
 B60L 1/00 (2006.01)
 B60L 58/12 (2019.01)
 (Continued)

(52) U.S. Cl.
 CPC ............ G01C 21/3469 (2013.01); B60L 1/00 (2013.01); B60L 58/12 (2019.02); B60L 58/26 (2019.02);
 (Continued)

(58) Field of Classification Search
 CPC ... G01C 21/3469; G01C 21/3679; B60L 1/00; B60L 58/12; B60L 58/26; B60L 58/27;
 (Continued)

(56) References Cited

U.S. PATENT DOCUMENTS

| 8,825,248 B2 * | 9/2014 | Maki | G01C 21/3469 |
| | | | 701/22 |
| 9,233,618 B2 * | 1/2016 | Dyer | B60L 53/64 |

(Continued)

FOREIGN PATENT DOCUMENTS

| CN | 107825967 A | 3/2018 |
| CN | 108933303 A | 12/2018 |
| CN | 110722995 A | 1/2020 |

OTHER PUBLICATIONS

First Office Action and Search Report on Chinese Appl. No.202110640039.X dated Jan. 18, 2024, 16 pages.

(Continued)

*Primary Examiner* — Daniel Kessie
*Assistant Examiner* — Brian K Baxter
(74) *Attorney, Agent, or Firm* — Foley & Lardner LLP

(57) ABSTRACT

An illustrative system includes a location sensor configured to sense location of an electric vehicle and to generate a signal indicative of an electric vehicle's location. An electric vehicle battery cooling system is configured to provide cooling to an electric vehicle's battery. A controller is electrically couplable to receive the signal indicative of an electric vehicle's location from the location sensor and is configured to determine battery energy for the electric vehicle to reach a location of a charging station. The battery energy is based on the location of the electric vehicle and an amount of electrical energy remaining in the electric battery. The controller is configured to initiate cooling of the electric battery based on the amount of electrical energy remaining in the electric battery and the battery energy for the electric vehicle to reach the location of the charging station.

14 Claims, 7 Drawing Sheets

(51) Int. Cl.

| | |
|---|---|
| *B60L 58/26* | (2019.01) |
| *B60L 58/27* | (2019.01) |
| *G01C 21/34* | (2006.01) |
| *G01C 21/36* | (2006.01) |
| *H01M 10/613* | (2014.01) |
| *H01M 10/625* | (2014.01) |
| *H01M 10/633* | (2014.01) |

(52) U.S. Cl.
CPC .......... *B60L 58/27* (2019.02); *G01C 21/3679* (2013.01); *H01M 10/613* (2015.04); *H01M 10/625* (2015.04); *H01M 10/633* (2015.04); *B60L 2240/545* (2013.01); *H01M 2220/20* (2013.01)

(58) Field of Classification Search
CPC .......... B60L 2240/545; H01M 10/613; H01M 10/625; H01M 10/633; H01M 2220/20
See application file for complete search history.

(56) References Cited

U.S. PATENT DOCUMENTS

| | | | | |
|---|---|---|---|---|
| 10,300,808 | B2 * | 5/2019 | Newman ................. | B60L 58/13 |
| 11,225,162 | B2 * | 1/2022 | Westin ..................... | B60L 1/20 |
| 2013/0249277 | A1 * | 9/2013 | Park ........................ | B60L 1/003 |
| | | | | 307/9.1 |
| 2014/0156108 | A1 * | 6/2014 | Reich ................. | G01C 21/3469 |
| | | | | 701/1 |
| 2015/0066837 | A1 * | 3/2015 | Twarog ................... | B60L 58/12 |
| | | | | 706/58 |
| 2016/0129797 | A1 * | 5/2016 | Jackson ................. | B60L 58/26 |
| | | | | 320/109 |
| 2017/0104449 | A1 * | 4/2017 | Drees ...................... | G01W 1/10 |
| 2018/0086223 | A1 * | 3/2018 | Lindemann ........ | G06Q 10/0631 |
| 2018/0273018 | A1 * | 9/2018 | Follen ................... | B60W 10/08 |
| 2018/0304765 | A1 * | 10/2018 | Newman ................. | B60L 58/26 |
| 2018/0361872 | A1 * | 12/2018 | Zhou ........................ | B60L 3/12 |
| 2019/0157882 | A1 * | 5/2019 | Sherback ................ | B60L 53/11 |
| 2019/0241086 | A1 * | 8/2019 | Bojahr .................. | H04W 4/021 |
| 2020/0076020 | A1 * | 3/2020 | Ogaki ................. | H01M 10/655 |
| 2020/0164761 | A1 * | 5/2020 | Shin ........................ | B60L 58/12 |
| 2020/0412160 | A1 * | 12/2020 | Manzoor ................ | B60L 50/60 |
| 2021/0101504 | A1 * | 4/2021 | Okamoto ................ | B60L 53/20 |
| 2021/0188125 | A1 * | 6/2021 | Zhao ................... | H01M 10/486 |
| 2021/0210810 | A1 * | 7/2021 | Chuang ................... | B60L 1/02 |
| 2021/0399355 | A1 * | 12/2021 | Darlix ................ | H01M 10/643 |
| 2022/0320872 | A1 * | 10/2022 | Jiang ...................... | H02J 7/007 |

OTHER PUBLICATIONS

Second Office Action on CN Appl. No. 202110640039.X dated Jun. 12, 2024.
Third Office Action on CN Application No. 202110640039.X dated Oct. 9, 2024.
Fourth Office Action on CN Application No. 202110640039.X dated Dec. 24, 2024.
Fifth Office Action on CN Appl. No. 202110640039.X dated Mar. 26, 2025.

\* cited by examiner

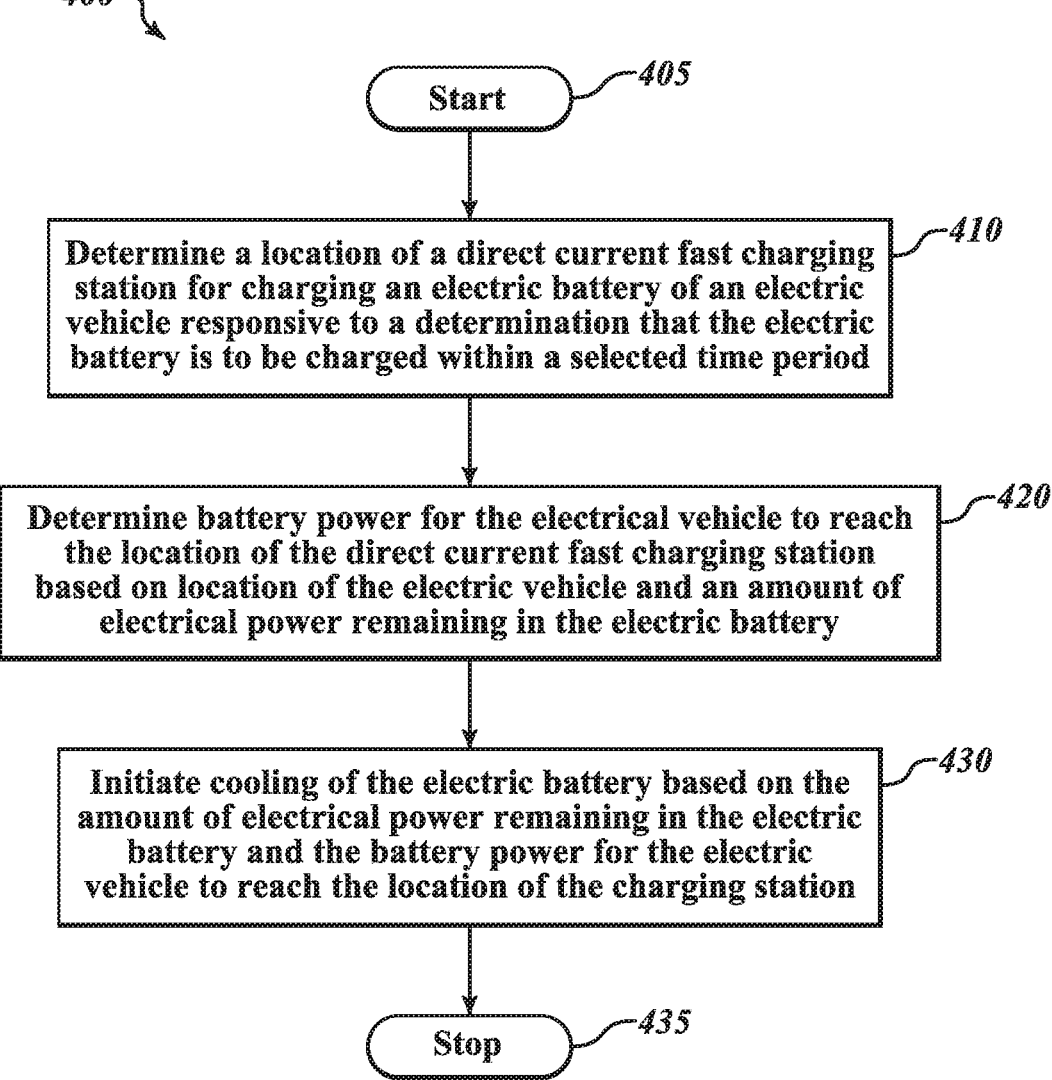

*400*

*405*

Start

*410*

Determine a location of a direct current fast charging station for charging an electric battery of an electric vehicle responsive to a determination that the electric battery is to be charged within a selected time period

*420*

Determine battery power for the electrical vehicle to reach the location of the direct current fast charging station based on location of the electric vehicle and an amount of electrical power remaining in the electric battery

*430*

Initiate cooling of the electric battery based on the amount of electrical power remaining in the electric battery and the battery power for the electric vehicle to reach the location of the charging station

*435*

Stop

*FIG.4A*

BATTERY PRE-COOLING SYSTEM AND METHOD

TECHNICAL FIELD

The present disclosure relates to charging of electric vehicle batteries.

BACKGROUND

The statements in this section merely provide background information related to the present disclosure and may not constitute prior art.

Electric vehicles (EVs) include direct current (DC) batteries that provide electrical power to electric motors for propulsion. Charging an EV's DC batteries entails converting alternating current (AC) electrical power to DC electrical power and providing DC current to the batteries at a voltage higher than that of the batteries.

Level 1 and Level 2 charging use AC-to-DC converters located onboard an EV to convert 120 VAC electrical power and 240 VAC electrical power, respectively, to DC electrical power for charging the EV's batteries. Using Level 1 charging at 120 VAC, it takes about 16 hours or so to fully charge an 80-mile battery and about 40 hours or so to fully charge a 200-mile battery. Using Level 2 charging at 240 VAC, it takes about 3.5 hours or so to fully charge an 80-mile battery and about 8 hours or so to fully charge a 200-mile battery.

In order to reduce charging time, DC fast charging stations have been developed. DC fast charging stations convert AC electrical power to DC electrical power at a charging station located external to an EV. Using Level 3 DC fast charging (in which 480 VAC electrical power is converted to DC electrical power at the charging station), it takes about 30 minutes or so to fully charge an EV battery. However, such fast charging stations involve high charging power—which in turn entails high charging current.

High power charging of large batteries using high charging current can result in self-heating of the battery due to Joule heating according to the following equation:

$$W = J^{-1} \cdot R \cdot I^2 \cdot t$$

Where
W is heat energy dissipated across the battery;
J is a constant;
R is internal resistance;
I is current; and
t is time.

Thus, the faster the charging through higher currents the higher the heat generated in the battery.

If the starting temperature of the battery is already high from use or from high ambient temperatures, then the resulting battery temperature during or following charging may possibly exceed safe thresholds. If the battery exceeds a threshold temperature, then charging will have to be slowed or even stopped until the temperature is brought below the threshold. Also, charging batteries at higher temperatures can have the effect of reducing battery life.

Thus, it is advantageous to either cool fast-charging batteries or pre-cool batteries prior to fast charging. Conventionally, cooling systems have been added to EVs that can cool the EV's battery when needed. However, the cost of cooling systems with a sufficient amount of power to cool an EV's battery during DC fast charging may exceed a reasonably-priced cooling system. Therefore, due to cost constraints, many (if not most) EVs include a cooling system with an insufficient amount of power to cool an EV's battery during DC fast charging.

In some conventional systems, the cooling capacity entailed in keeping the battery under the high temperature threshold may be greater than the installed cooling capacity of the system chosen. In some such cases, there may be some instances that may not allow the battery to be cooled enough during fast charging.

SUMMARY

Disclosed embodiments include systems for pre-cooling electric vehicle batteries prior to charging, an electric vehicle with a system for pre-cooling electric vehicle batteries prior to charging, and methods for pre-cooling electric vehicle batteries prior to charging.

In an illustrative embodiment, a system is provided for pre-cooling at least one electric vehicle battery prior to charging. A location sensor is configured to sense location of an electric vehicle and is further configured to generate a signal indicative of location of an electric vehicle. An electric vehicle battery cooling system is configured to provide cooling to an electric battery of an electric vehicle. A controller is electrically couplable to receive the signal indicative of location of an electric vehicle from the location sensor. The controller is configured to determine battery energy for the electric vehicle to reach a location of a charging station for charging an electric battery of an electric vehicle. The battery energy is based on the location of the electric vehicle and an amount of electrical energy remaining in the electric battery. The controller is further configured to initiate cooling of the electric battery based on the amount of electrical energy remaining in the electric battery and the battery energy for the electric vehicle to reach the location of the charging station.

In another illustrative embodiment, an electric vehicle includes a chassis, a front axle disposed on the chassis, a rear axle disposed on the chassis, at least one electric motor couplable to the front axle, at least one electric motor couplable to the rear axle, and at least one battery electrically connectable to the electric motors. The vehicle includes a system that includes: a battery cooling system configured to provide cooling to the at least one battery; a location sensor configured to sense location of the electric vehicle and further configured to generate a signal indicative of location of the electric vehicle; and a controller electrically couplable to receive the signal indicative of location of the electric vehicle from the location sensor. The controller is configured to determine battery energy for the electric vehicle to reach a location of a charging station for charging an electric battery of an electric vehicle. The battery energy is based on the location of the electric vehicle and an amount of electrical energy remaining in the electric battery. The controller is further configured to initiate cooling of the electric battery based on the amount of electrical energy remaining in the electric battery and the battery energy for the electric vehicle to reach the location of the charging station.

In another illustrative embodiment, a method is provided for pre-cooling at least one electric vehicle battery prior to charging. A location of a charging station for charging an electric battery of an electric vehicle is determined responsive to a determination that the electric battery is to be charged within a selected time period. Battery energy for the electrical vehicle to reach the location of the charging station is determined based on location of the electric vehicle and an amount of electrical energy remaining in the electric battery. Cooling of the electric battery is initiated based on the amount of electrical energy remaining in the electric battery and the battery energy for the electric vehicle to reach the location of the charging station.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 4A is a flow chart of an illustrative method for pre-cooling at least one electric vehicle battery prior to charging.

Like reference symbols in the various drawings generally indicate like elements.

DETAILED DESCRIPTION

Figure 1:
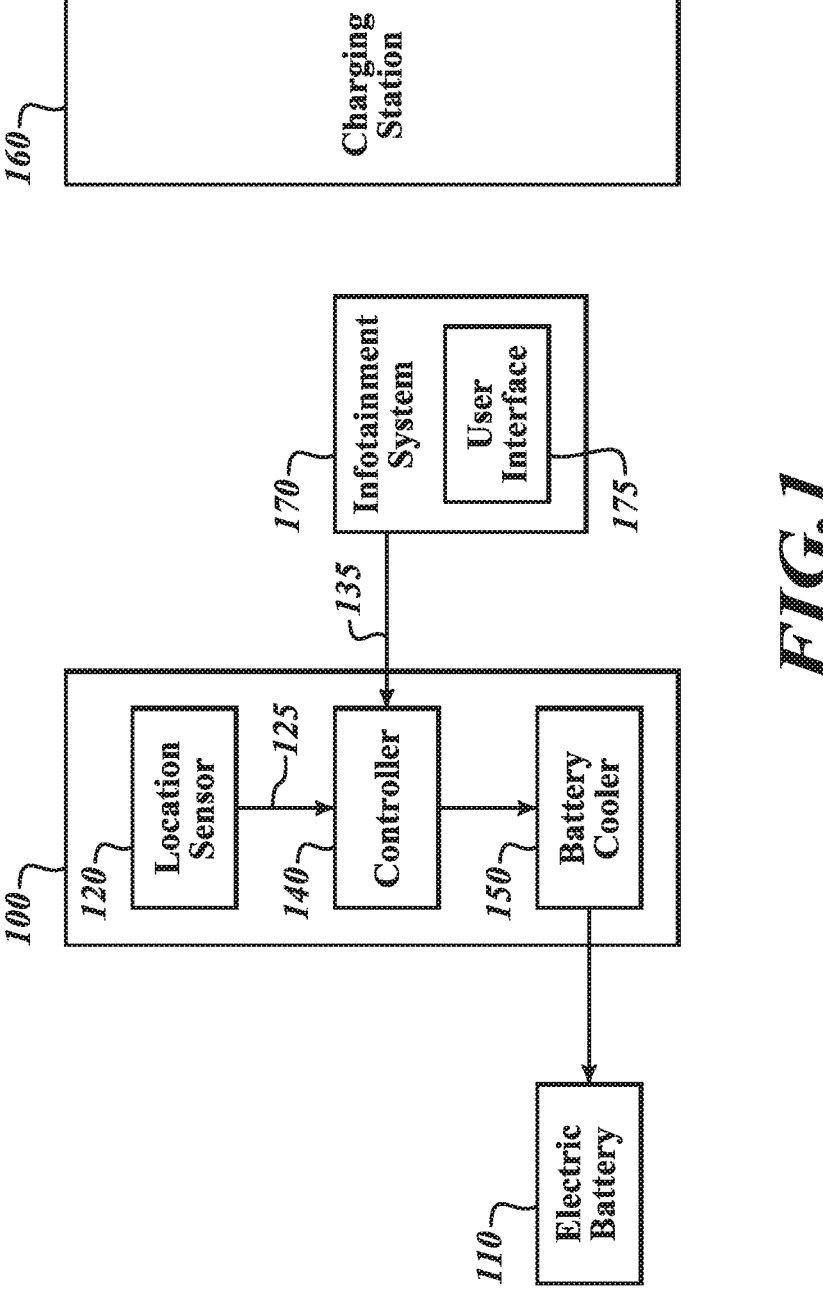
FIG. 1 is a block diagram of an illustrative system for pre-cooling at least one electric vehicle battery prior to charging.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Disclosed embodiments include an electric vehicle, methods for pre-cooling electric vehicle batteries prior to charging, and systems for pre-cooling electric vehicle batteries prior to charging. Various embodiments can help strive to keep EV batteries cool enough during charging to help the EV batteries to accept maximized charging current in order to help contribute to minimizing charge time. Various embodiments can help contribute to attempting to avoid instances that may not allow the battery to be cooled enough during fast charging.

Given by way of overview and referring to FIG. 1, in various embodiments an illustrative system 100 is provided for pre-cooling at least one electric battery 110 of an electric vehicle (not shown) prior to charging. A location sensor 120 is configured to sense location of the electric vehicle and is further configured to generate a signal 125 that is indicative of location of the electric vehicle. An electric vehicle battery cooling system 150 is configured to provide cooling to the electric vehicle's battery 110. A controller 140 is electrically couplable to receive the signal 125 from the location sensor 120. The controller 140 is configured to determine battery energy for the electric vehicle to reach a location of an electric vehicle charging station 160—such as without limitation a direct current fast charging station—for charging the electric battery 110. The battery energy is based on the location of the electric vehicle and an amount of electrical energy remaining in the electric battery 110. The controller 140 is further configured to initiate cooling of the electric battery 110 based on the amount of electrical energy remaining in the electric battery 110 and the battery energy for the electric vehicle to reach the location of the charging station 160.

Now that an overview has been given, illustrative details will be explained by way of non-limiting examples given by way of illustration only and not of limitation.

In various embodiments the location sensor 120 may include without limitation a Global Positioning System (GPS) device. However, it will be appreciated that the location sensor 120 may include any suitable location sensor as desired for a particular application, such as without limitation an inertial navigation system and the like. Further, dead reckoning navigation systems, that use steering direction, speed, and distance if connection to the cloud or GPS satellites are lost, may also be applied.

In various embodiments the controller 140 may be any of a variety of suitable controllers including but not limited to any of a variety of microprocessor-based controllers, ASICs, and the like. In some embodiments the controller 140 may be provided as part of a vehicle's infotainment system 170. In some other embodiments the controller 140 may be separate from the vehicle's infotainment system 170

In various embodiments, the controller 140 is configured to receive a signal 135 indicative of a determination that the electric battery 110 is to be charged and that the electric vehicle will proceed to the charging station 160. For example, in some embodiments a user interface 175 may be provided, such as in the infotainment system 170 (which is, in turn, electrically connected to the controller 140). In such embodiments, a user may determine that the electric battery 110 is to be charged and may make an appropriate selection via the user interface 170. Also, a user may make a determination that the electric vehicle will proceed to a charging station and may select a particular charging station to be used for charging. In such instances, the signal 135 is generated by the infotainment system 170 responsive to user input to the user interface 170 and is received by the controller 140. In accordance with an illustrative embodiment, any control module on the vehicle may be configured to determine or house the vehicle and/or the charging station's location. Cloud computing can allow this calculation and storage to be done outside of the vehicle, provided the vehicle has a communication connection to the cloud service.

In some other embodiments the vehicle may be a self-driving vehicle with full or partial self driving capabilities. In such embodiments, automated systems of the self driving vehicle make the determination to charge the electric battery 110 and provide the signal 135 to the controller 140.

As noted above, in various embodiments the controller 140 is configured to make various determinations. For example and as noted above, the controller 140 is configured to determine battery energy for the electric vehicle to reach the location of the charging station 160. In such embodiments, the battery energy is based on the location of the electric vehicle and an amount of electrical energy remaining in the electric battery 110.

In some illustrative embodiments, the battery energy for the electric vehicle to reach the location of the charging station 160 may be further based on a determination of distance of electric vehicle from the location of the charging station 160 and a predetermined speed of the electric vehicle. As long as it is known where the vehicle is and where the vehicle needs to go to get to the next charging station, a very good estimate of the amount of energy required to move the car to the charging location may be determined. This amount of energy compared to the energy that remains in the battery can be compared to determine what actions can be taken to pre-cool the battery. If there is enough energy to pre-cool, then pre-cooling may be instituted. If there is not enough energy then no pre-cooling of the battery will be initiated.

There are many factors in addition to speed that can be included in calculating the amount of energy required to move the vehicle from its present location to the charging location. Additional considerations can be but are not limited to an elevation change between the locations, predicting climate control loads, etc. Since it is known, through the range certification process, what the "normal" energy consumption per unit distance is (say, Wh/mile, for example) multiplying this consumption by the distance travelled will yield the amount of energy to be consumed for the vehicle to reach the charging destination. Modifying that value for additional conditions would make the calculation more accurate.

Further, in various embodiments the battery energy for the electric vehicle to reach the location of the charging station may also be based on a determination of energy being used by at least one component of the electric vehicle such as a powertrain of the electric vehicle, a 12 VDC system of the electric vehicle, and/or interior climate control energy of the electric vehicle. In such embodiments, a battery charge depletion rate can be determined for any one or more of these factors and can be factored into the determination discussed above for battery energy for the electric vehicle to reach the location of the charging station 160. Many additional considerations can be added to the calculation to make the predicted energy consumption more accurate or more fitting to the situation. For example, traffic information can be added if it is determined that a significant additional time, than "normal", is required to move the vehicle from the present location to the charging location. Time does not impact powertrain energy consumption greatly but using a climate control system for aiding determination of battery energy available for pre-cooling may be advantageous.

In various embodiments, battery power for cooling of the electric battery 110 may be determined based on at least one factor including temperature of the electric battery 110. Many factors can be added to the calculation to determine the predicted amount of energy required to predict the amount of energy needed to move the vehicle from a known location to a charging location and if that energy needed is low enough to permit predictive battery cooling so that the resulting charge time will be minimized because power into the battery can be maximized, and maximized for a longer time resulting in more energy per unit time being added to the battery allowing drivers to get back on the road more quickly.

As discussed above, in various embodiments the controller 140 is configured to initiate cooling of the electric battery 110 based on the amount of electrical energy remaining in the electric battery 110 and the battery energy for the electric vehicle to reach the location of the charging station 160. In some embodiments the controller 140 may be further configured to cause the electric battery 110 to be cooled to a threshold temperature.

In accordance with an illustrative embodiment, once it is determined that the vehicle is heading to a charging station, and especially if the available charging power is known at the charging station, the current battery temperature may be noted. A second calculation may be done based on the current battery temperature and the anticipated and possible charging power resulting in a predicted resulting temperature of the battery. If the resultant battery temperature is higher than a maximum temperature, say, 50 C, then predictive cooling is started. The intensity of the cooling becomes a function of the predicted resulting temperature minus the current battery temperature. Generally, predicted cooling power is equal to the difference of the predicted resulting temperature (in turn a function of predicted charging power) minus the starting temperature (current battery temperature). The higher the change in temperature, the higher the needed cooling power. Once a determination has been made (either by an operator or the vehicle's automated system) that the electric battery 110 should be charged, an operator or the vehicle's automated system searches for a charging station, such as a direct current fast charging station. After a suitable charging station has been located, the controller 140 calculates when pre-cooling of the electric battery 110 by the battery cooling system 150 should begin.

In various embodiments the controller 140 is further configured to initiate cooling of the electric battery 110 based on the amount of electrical energy remaining in the electric battery 110 and the battery energy for the electric vehicle to reach the location of the charging station 160. After it has been determined when the electric vehicle will arrive at the charging station 160, in various embodiments the controller 140 determines how much electrical energy should be remaining in the electric battery 110 after the electric vehicle reaches the charging station 160. In various embodiments the controller 140 may determine that some portion of such remaining electrical power may be used to pre-cool the electric battery 110 using the battery cooling system 150 while the electric vehicle travels to the charging station 160. The determination of how much of the remaining electrical energy may be used may be based on a number of factors including, but not limited to, distance of the electric vehicle from the location of the charging station 160, a predetermined speed of the electric vehicle, a determination of electrical energy being used by one or more components of the vehicle such as without limitation a powertrain of the electric vehicle, a 12 VDC system of the electric vehicle, and/or interior climate control of the vehicle, as well as a predetermined safety factor to reserve some electrical energy for contingencies.

After a determination has been made regarding an amount of electrical energy that can be used for pre-cooling the electrical battery 110 and regarding the rate of power consumption by the battery cooling system 150, a determination is made by the controller 140 regarding when to switch on the battery cooling system 150 while in transit to the charging station 160. When it is time to switch on the battery cooling system 150, the controller 140 automatically turns on the battery cooling system 150 unless turning on the battery cooling system 150 has been overridden by the operator or another electronic control system of the electric vehicle.

In various embodiments, the battery cooling system 150 suitably includes a radiator, a fan, coolant hoses, refrigerant tubes, temperature sensors, an electric AC refrigerant compressor, an expansion valve, an evaporator and/or refrigerant to coolant heat exchanger, etc. all designed to cool coolant that is circulated through the battery to enable battery cooling. These same components may also be used to enable battery heating as well.

Accordingly, it will be appreciated that in various embodiments, using energy of the electrical battery 110 to cool the electrical battery 110 prior to charging of the electrical battery 110 can help provide an improved charging environment. It will also be appreciated that, to help contribute to ensuring that range is not an issue, only electrical energy that is available after the electric vehicle is calculated to have reached the charging station 160 is used to pre-cool the electrical battery 110.

It will be appreciated that an attempt to optimize charging time by decreasing the possibility of battery temperature exceeding a thermal threshold (thereby resulting in decreasing the charge rate) may result in a subsequent increase in charge time. It will be noted that the rate of energy use to pre-cool the electrical battery 110 should be about 4% of the charge rate—meaning that even though charge time may increase to compensate for energy used to pre-cool the battery, typical numbers are that use of about 6-8 kW to pre-cool the electrical battery 110 is entailed compared to a planned 150 kW charging rate. So, for example, every minute of pre-cooling may result in about 2.4 seconds or so of charge time.

Figure 2:
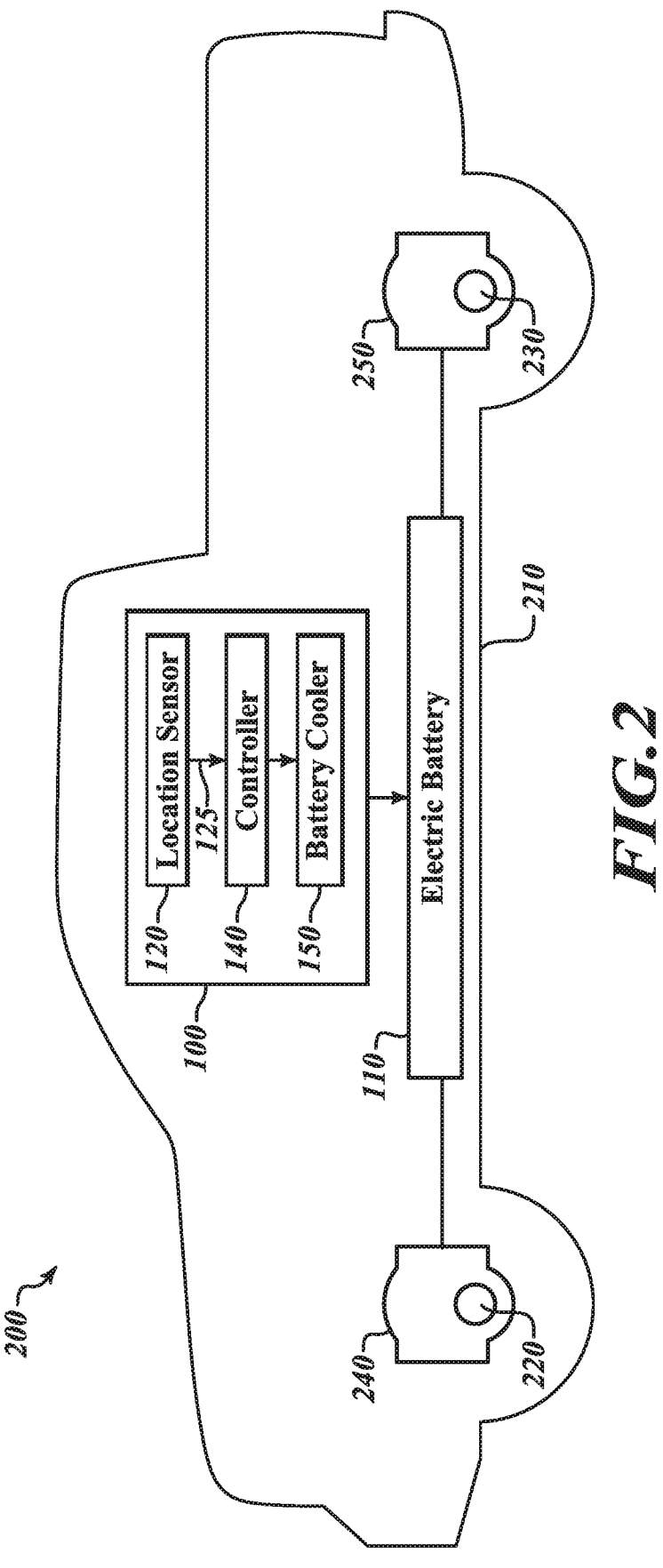
FIG. 2 is a block diagram in partial schematic form of an illustrative electric vehicle with the system of FIG. 1.

Referring additionally to FIG. 2, in various embodiments an electric vehicle 200 includes a chassis 210, a front axle 220 disposed on the chassis 210, a rear axle 230 disposed on the chassis 210, at least one electric motor 240 couplable to the front axle 220, at least one electric motor 250 couplable to the rear axle 230, and at least one of the batteries 110 that are electrically connectable to the electric motors 240 and 250. In various embodiments the electric vehicle 200 includes the system 100 of FIG. 1 that includes: the battery cooling system 150 configured to provide cooling to the at least one electric battery 110. The location sensor 120 is configured to sense location of the electric vehicle 200 and is further configured to generate a signal 125 indicative of location of the electric vehicle 200. The controller 140 is electrically couplable to receive the signal 125 from the location sensor 120. The controller 140 is configured to determine battery energy for the electric vehicle 200 to reach a location of a charging station for charging the electrical battery 110 of electric vehicle 200. The battery energy is based on the location of the electric vehicle 200 and an amount of electrical energy remaining in electric battery 110. The controller 140 is further configured to initiate cooling of the electrical battery 110 based on the amount of electrical energy remaining in the electrical battery 110 and the battery energy for the electric vehicle 200 to reach the location of the charging station.

The system 100 has been explained in detail above. As a result, it will be appreciated that further description of construction or operation of the system 100 is not necessary for an understanding of disclosed subject matter.

In various embodiments, it will be appreciated that the electric vehicle 200 is representative of any type of electric vehicle or plug-in electric vehicle, including, but not limited to electric and hybrid cars, trucks, vans, sports utility vehicles (SUVs), buses, trains, marine vessels (surface and submersible), aircraft, and the like.

Figure 3:
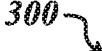
FIG. 3 is an illustrative graph depicting temperature versus time for a non-pre-cooled battery of an electric vehicle and for a pre-cooled battery of an electric vehicle.
Figure 3:
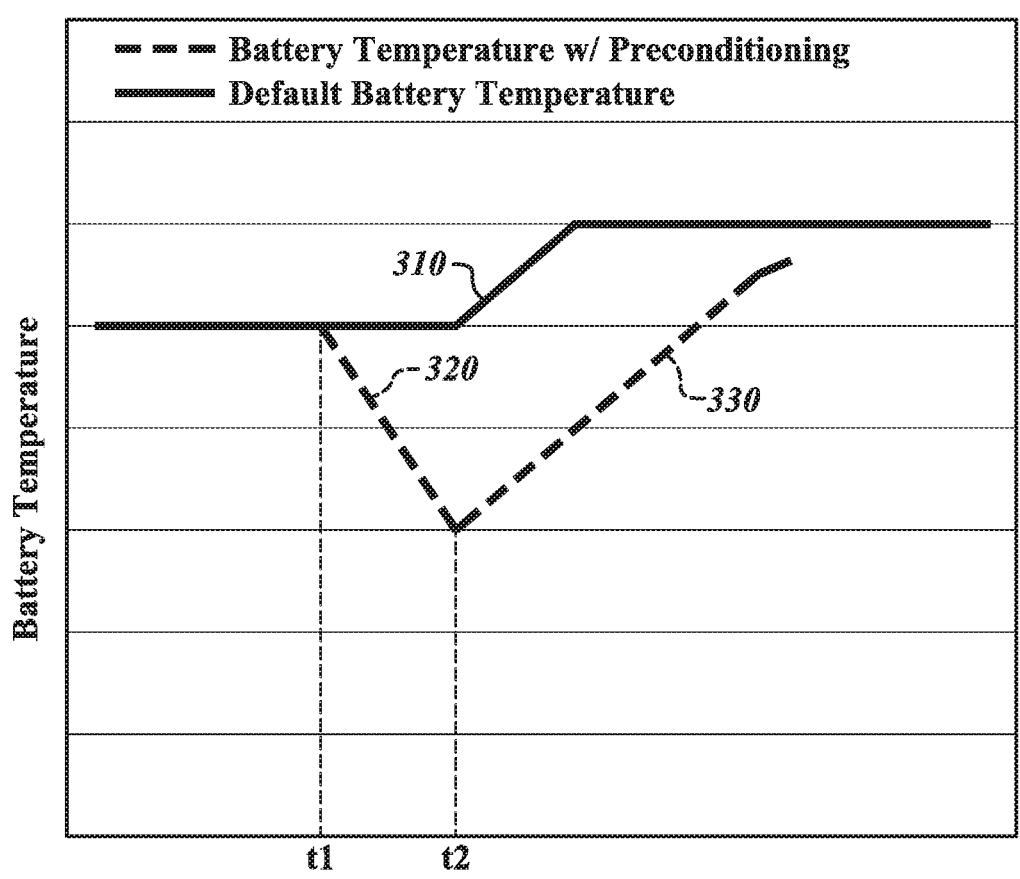

Referring now to FIG. 3, a graph 300 plots temperature versus time for a non-pre-cooled battery of an electric vehicle and for a pre-cooled battery of an electric vehicle. Charging for the non-pre-cooled battery proceeds along a segment 310. Pre-cooling for the pre-cooled battery begins at time t1 and proceeds along a segment 320. Charging is started at a time t2 and proceeds along a segment 330. As can be seen by the segment 320, as the battery is pre-cooled without charging, the temperature of the battery decreases. At the time t2, temperature of the non-pre-cooled battery rises and temperature of the pre-cooled battery temperature rises. As can be seen in FIG. 3, it will be appreciated that, by using disclosed systems and methods, temperature of the pre-cooled battery can remain lower throughout the charging process than if the battery were not pre-cooled.

Referring now to FIG. 4A, an illustrative method 400 for pre-cooling at least one electric vehicle battery prior to charging starts at a block 405. At a block 410 a location of a charging station for charging an electric battery of an electric vehicle is determined responsive to a determination that the electric battery is to be charged within a selected time period. At a block 420 battery energy for the electrical vehicle to reach the location of the charging station is determined based on location of the electric vehicle and an amount of electrical energy remaining in the electric battery. At a block 430 cooling of the electric battery is initiated based on the amount of electrical energy remaining in the electric battery and the battery energy for the electric vehicle to reach the location of the charging station. The method 400 stops at a block 435.

Figure 4B:
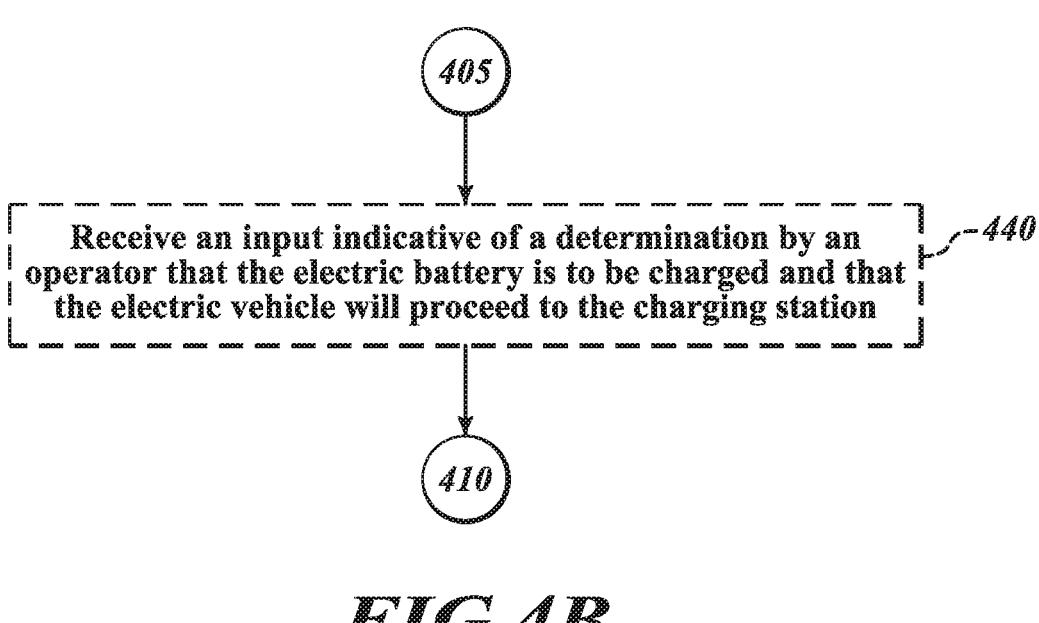
FIGS. 4B-4G are flow charts of details of the method of FIG. 4A.

Referring now to FIG. 4B, in various embodiments an input indicative of a determination that the electric battery is to be charged and that the electric vehicle will proceed to the charging station may be received at a block 440.

Figure 4C:
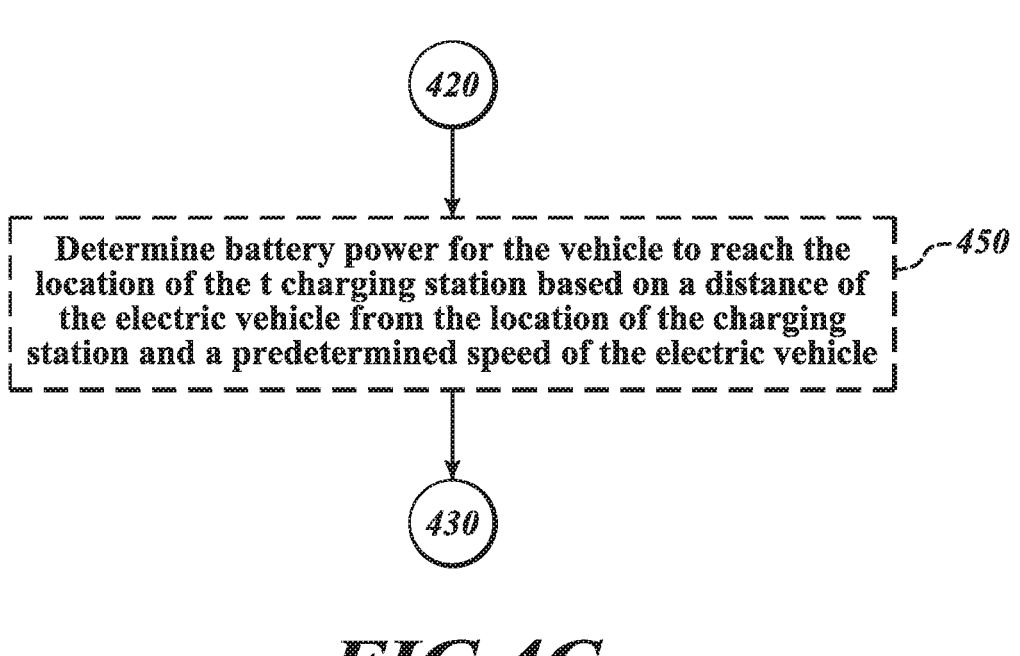

Referring now to FIG. 4C, in various embodiments determining battery energy for the electrical vehicle to reach the location of the charging station based on location of the electric vehicle and an amount of electrical energy remaining in the electric battery at the block 420 may include determining battery energy for the vehicle to reach the location of the charging station based on a distance of the electric vehicle from the location of the charging station and a predetermined speed of the electric vehicle at a block 450.

Figure 4D:
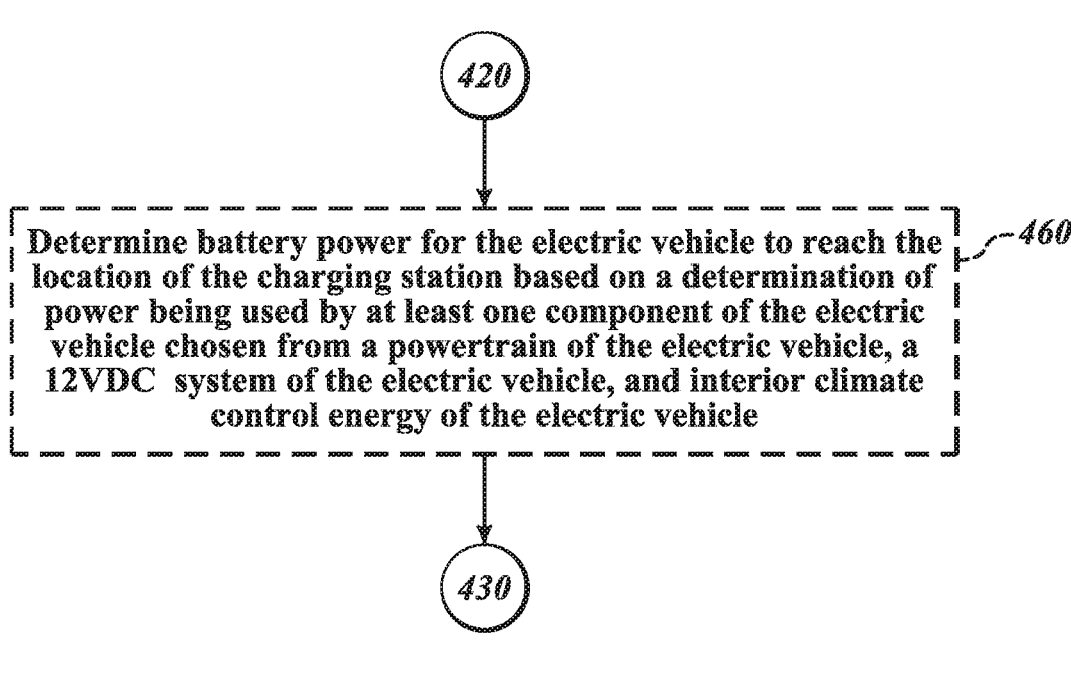

Referring now to FIG. 4D, in various embodiments the method 400 may also include determining battery energy for the electric vehicle to reach the location of the charging station based on a determination of energy required by at least one component of the electric vehicle chosen from a powertrain of the electric vehicle, a 12 VDC system of the electric vehicle, and interior climate control energy of the electric vehicle at a block 460.

Figure 4E:
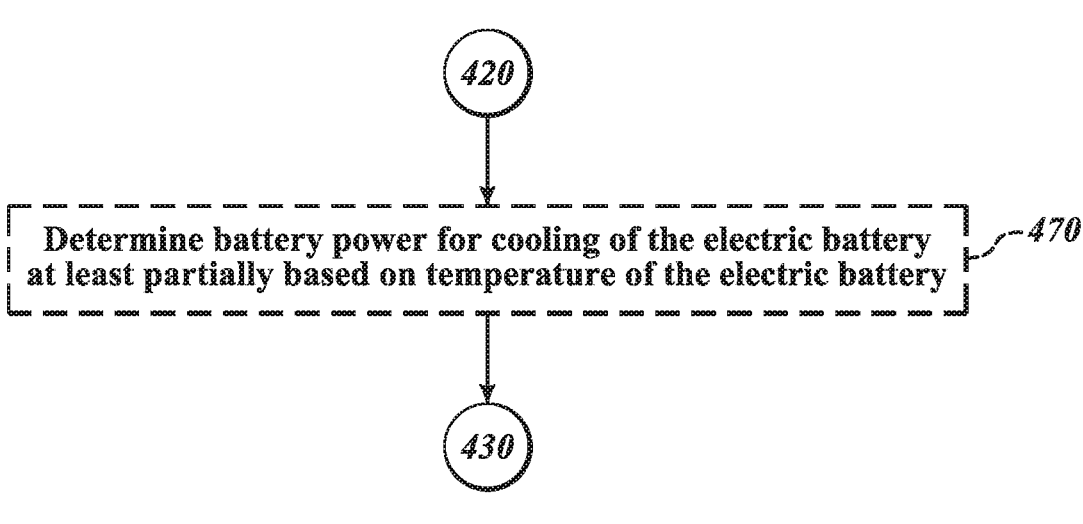

Referring now to FIG. 4E, in various embodiments the method 400 may also include determining battery power for cooling of the electric battery at least partially based on temperature of the electric battery at a block 470.

Figure 4F:
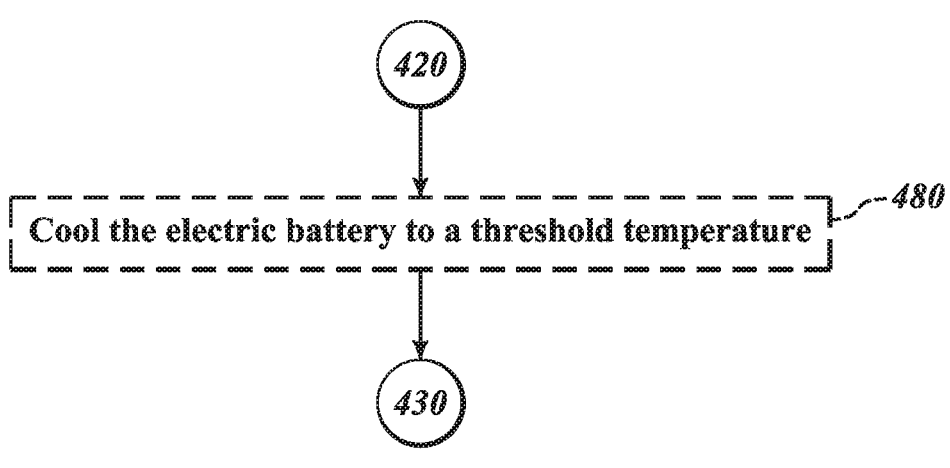

Referring now to FIG. 4F, in various embodiments the method 400 may also include cooling the electric battery to a threshold temperature at a block 480.

Figure 4G:
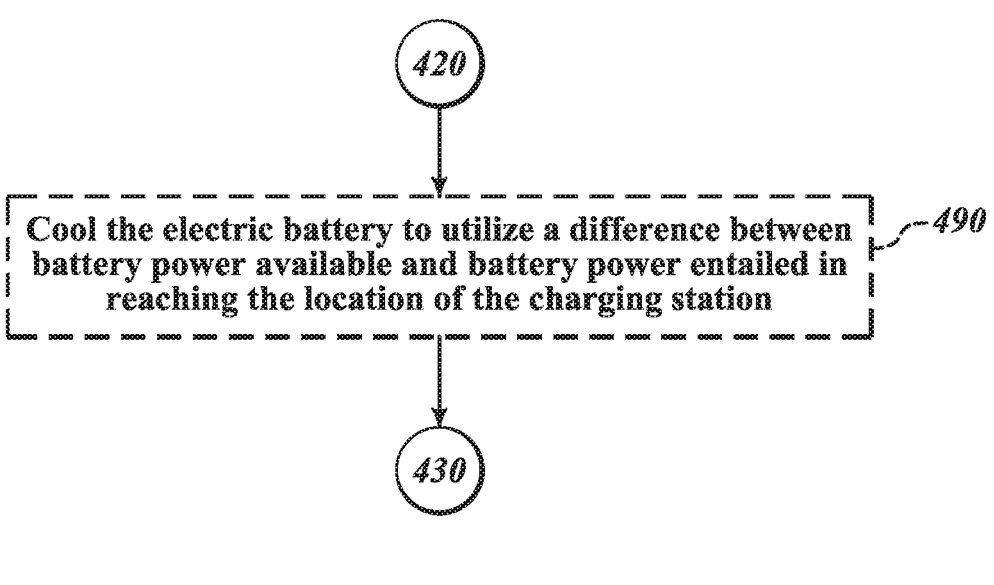

Referring now to FIG. 4G, in various embodiments the method 400 may also include cooling the electric battery to utilize a difference between battery energy available and battery energy entailed in reaching the location of the charging station at a block 490.

It will be appreciated that, as explained above, in various illustrative and non-limiting manners a battery can be pre-cooled prior to a charging process, such as without limitation a fast charging process.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system comprising:
   a sensor configured to generate a signal indicative of a location of an electric vehicle;
   an electric vehicle battery thermal system configured to provide cooling to a battery of the electric vehicle; and
   a controller electrically couplable to receive the signal, the controller configured to:
      determine a battery energy for the electric vehicle to reach a location of a charging station to charge the battery, the battery energy based on:
         the location of the electric vehicle;
         an energy consumption per unit distance at a predetermined speed of the electric vehicle;
         an elevation change between the location of the electric vehicle and the location of the charging station; and
         an amount of electrical energy remaining in the battery;
      receive a signal indicative of a determination, by an operator, that the electric vehicle will proceed to the charging station to charge the battery; and
      determine a time to initiate the battery thermal system to cool the battery while in transit from the location of the electric vehicle to the location of the charging station based on:
         the battery energy,
         a current temperature of the battery, and
         a predicted resulting temperature, of the battery after charging the battery, the predicted resulting temperature based at least on the battery energy and a determined charging power of the charging station.

2. The system of claim 1, wherein the battery energy is based on a determination of distance of the electric vehicle from the location of the charging station.

3. The system of claim 1, wherein the battery energy is based on a determination of energy used by at least one additional component of the electric vehicle chosen from:
   an auxiliary direct current (DC) system of the electric vehicle,
   an interior climate control system of the electric vehicle, and
   a powertrain of the electric vehicle.

4. The system of claim 1, wherein the controller is configured to cause the battery to be cooled or warmed to a threshold temperature.

5. An electric vehicle comprising:
   a battery electrically connectable with at least one electric motor; and
   a system including:
      a battery thermal system configured to provide cooling to the battery;
      a sensor configured to generate a signal indicative of a location of the electric vehicle; and a controller electrically couplable to receive the signal, the controller configured to:

determine a battery energy for the electric vehicle to reach a location of a charging station for charging the battery of the electric vehicle, the battery energy based on the location of the electric vehicle, an energy consumption per unit distance at a predetermined speed of the electric vehicle, an elevation change between the location of the electric vehicle and the location of the charging station, and an amount of electrical energy remaining in the battery;

receive a signal indicative of a determination, by an operator, that the electric vehicle will proceed to the charging station to charge the battery; and determine a time to initiate the battery thermal system to cool the battery while in transit from the location of the electric vehicle to the location of the charging station based on the battery energy, a current temperature of the battery, and a predicted resulting temperature of the battery after charging the battery, the predicted resulting temperature based at least on the battery energy and a determined charging power of the charging station.

6. The electric vehicle of claim 5, wherein the battery energy is based on a determination of distance of the electric vehicle from the location of the charging station.

7. The electric vehicle of claim 5, wherein the battery energy is based on a determination of energy used by at least one additional component of the electric vehicle chosen from:

an auxiliary direct current (DC) system of the electric vehicle, an interior climate control system of the electric vehicle, and a powertrain of the electric vehicle.

8. The electric vehicle of claim 5, wherein the controller is configured to cause the battery to be cooled to a threshold temperature.

9. The electric vehicle of claim 5, wherein the controller is configured to cause the battery to be cooled based upon a difference in battery energy available and the battery energy.

10. A method comprising:

determining a location of a charging station for charging a battery of an electric vehicle responsive to a determination that the battery is to be charged within a selected time period;

determining a battery energy for the electric vehicle to reach the location of the charging station based on a location of the electric vehicle, an energy consumption per unit distance at a predetermined speed of the electric vehicle, energy used by a powertrain of the electric vehicle, an elevation change between the location of the electric vehicle and the location of the charging station, and an amount of electrical energy remaining in the battery;

receiving a signal indicative of a determination, by an operator, that the electric vehicle will proceed to the charging station to charge the battery; and determining a time to initiate a battery thermal system to cool the battery while in transit from the location of the electric vehicle to the location of the charging station based on the battery energy, a current temperature of the battery, and a predicted resulting temperature of the battery after charging the battery, the predicted resulting temperature based at least on the battery energy and a determined charging power of the charging station.

11. The method of claim 10, comprising:

determining the battery energy based on a distance of the electric vehicle from the location of the charging station.

12. The method of claim 10, comprising:

determining the battery energy based on a determination of energy required by at least one additional component of the electric vehicle chosen from:

an auxiliary direct current (DC) system of the electric vehicle, an interior climate control system of the electric vehicle, and a powertrain of the electric vehicle.

13. The method of claim 10, comprising:

cooling the battery to a threshold temperature.

14. The method of claim 10, comprising:

cooling the battery to utilize a difference between battery energy available and the battery energy.

* * * * *